United States Patent [19]

Reed

[11] 4,164,156

[45] Aug. 14, 1979

[54] FULL REVERSING HYDROMECHANICAL STEERING TRANSMISSION WITH MULTI-RANGE SYNCHRONOUS SHIFTING CONCENTRIC GEAR TRAIN PACKAGE

[75] Inventor: Bradley O. Reed, Pittsfield, Mass.

[73] Assignee: General Electric Company

[21] Appl. No.: 872,255

[22] Filed: Jan. 25, 1978

[51] Int. Cl.² .................. F16H 47/04; F16H 37/06; F16H 57/10

[52] U.S. Cl. .................. 74/687; 74/720.5; 74/765; 74/753

[58] Field of Search ............ 74/753, 759, 765, 687, 74/720.5

[56] References Cited

U.S. PATENT DOCUMENTS

| | | | |
|---|---|---|---|
| 3,118,319 | 1/1964 | Straub | 74/759 X |
| 3,199,376 | 8/1965 | DeLalio | 74/687 X |
| 3,410,157 | 11/1968 | Livezey | 74/759 X |
| 3,492,891 | 2/1970 | Livezey | 74/687 X |
| 3,534,632 | 10/1970 | Smith | 74/687 |
| 3,596,535 | 8/1971 | Polak | 74/720.5 |
| 3,603,176 | 9/1971 | Tipping et al. | 74/720.5 X |
| 3,667,321 | 6/1972 | Maurice | 74/687 X |
| 3,722,324 | 3/1973 | Cordner et al. | 74/687 |

Primary Examiner—Lance W. Chandler
Attorney, Agent, or Firm—Francis K. Richwine

[57] ABSTRACT

A multi-range synchronous shifting concentric gear train package having two inputs and a single output which when connected to a mechanical input and to the output of an infinitely variable drive device (shown as a hydrostatic component) powered by the same mechanical input with the input axes aligned with the center of rotation of the components of the gear package forms an all concentric multi-range synchronous shifting hydromechanical transmission. The combination of the same gear train package with mechanical and hydrostatic inputs in combination with right and left output planetary gear sets and a hydrostatic steer arrangement powered by the same mechanical input forms a hydromechanical steering transmission having a concentric gear train package. Gear train elements for exchanging the rotational movement of inner and outer shafts of a set of concentric shafts to permit implementation of the concentric gear train package are also disclosed in detail.

10 Claims, 10 Drawing Figures

FULL REVERSING HYDROMECHANICAL STEERING TRANSMISSION WITH MULTI-RANGE SYNCHRONOUS SHIFTING CONCENTRIC GEAR TRAIN PACKAGE (The United States Government has rights in this invention pursuant to Contract No. DAAE07-76-C-3259 awarded by the Department of the Army.)

SUMMARY OF THE INVENTION

The invention is an improved synchronous shifting multi-range gear train package for hydromechanical transmissions comprising a plurality of planetary gear sets which are concentric about a common centerline to provide four distinct forward hydromechanical speed ranges usable with a full reversing system or having additional included mechanical components including a brake to provide a separate and distinct hydromechanical reverse range. The invention also contemplates use of the gear train package in combination with other components including an infinitely variable device and additional output planetary gear sets to form a steering transmission.

RELATED APPLICATIONS

This application is based on the same disclosure as is the concurrently filed copending application Ser. No. 872,252 assigned to the same assignee.

BACKGROUND OF THE INVENTION

1. The Field of the Invention

This invention pertains to multi-range synchronous shifting hydromechanical transmissions including steering transmissions wherein a gear train powered both by a mechanical input and the output of an infinitely variable device, e.g., a hydrostatic component also powered by the mechanical input, contains concentric gearing to supply various output combinations of the two inputs in distinct ranges, each range having a distinct torque ratio and wherein shifts between ranges are accomplished by relatively simultaneous activation of a brake or clutch controlling operation in one range and the deactivation of the brake or clutch controlling another range and wherein the hydrostatic component provides continuously variable drive ratios. More specifically, this invention pertains to hydromechanical transmissions wherein the gears forming the mechanisms to provide the distinct ranges are concentric in that they rotate about a common centerline so as to facilitate packaging of transmissions into a more compact form.

2. Description of the Prior Art

No all concentric, synchronous shifting hydromechanical transmission having three or more forward hydromechanical ranges or concentric gearbox for such transmission is known to Applicant other than that disclosed in this and the companion Application.

There are disclosures of concentric gear train hydromechanical transmissions or gear trains for such which have less than three forward ranges. These include the patents of Cockrell, U.S. Pat. No. 3,489,036, which is an all concentric, synchronous shifting truck transmission having a hydromechanical low/reverse range and a hydromechanical high range; Tipping, U.S. Pat. No. 3,752,010, which is also an all concentric truck transmission, having a hydrostatic low/reverse range combined with a hydromechanical high range; and Polak, U.S. Pat. No. 3,982,448, which discloses three models, two of which are all concentric truck transmissions having two forward ranges and one model which is not concentric in that it provides for an extra or third forward speed through the use of an additional shaft offset from the main axis. The transmission of W. A. Ross, U.S. Pat. No. 3,396,607, must be noted because to Applicant's knowledge it represents the only two forward range hydromechanical truck transmission in actual production. The transmission having a hydraulic component and a mechanical component, each on a separate shaft, is not concentric and includes a hydrostatic low/reverse range and a hydromechanical high range.

There are transmissions having three or more hydromechanical forward ranges which are neither all concentric nor contain a concentric gear train package. In this category are Tuck, U.S. Pat. No. 3,433,095, constituting a two axis non-concentric, three forward hydromechanical range transmission; and Nolan and Reed, U.S. Pat. No. 3,861,240, also constituting a two axis transmission having three hydromechanical forward ranges.

In addition, there are gear train packages or in some cases truck transmissions used with other components to constitute a steering transmission for track laying vehicles which have characteristics similar to some of the truck transmissions referred to above. An example is Polak, U.S. Pat. No. 3,596,535, wherein a full reversing mechanism and a differential "steer over" device have been superimposed on a truck transmission wherein the basic transmission gear train, although having a plurality of concentric planetary sets, depends on an additional shaft for the mechanical input to produce a hydrostatic low and a plurality of successively higher hydromechanical ranges. The Patents to Livezey, U.S. Pat. Nos. 3,575,066 and 3,583,256, are further examples of synchronous shifting multi-range steering transmissions similar in description to Polak, U.S. Pat. No. 3,596,535.

The transmission of Mooney et al, U.S. Pat. No. 3,777,593, most closely approaches the result obtained by the subject gear train and transmissions in that it contains an all concentric, synchronous shifting, multi-range truck transmission providing a hydrostatic low and two additional higher forward hydromechanical ranges wherein reverse gear is a part of the low range. This concentric transmission is, therefore, a three range transmission having one hydrostatic and two hydromechanical ranges based on two adjacent concentric planetary sets wherein one input is placed on both suns, one carrier is the output and is tied to the other ring. This is a fairly common combination of planetary sets (Simpson gear train) but Mooney by reversing the normal order of the two sets, inserting the second input by means of an axial shaft to the far side of the planetaries and using a drum to connect the "inside" planetary to output has obtained a very compact three range transmission that is concentric. However, Mooney's transmission is limited in flexibility and in range of torque output. The maximum torque used by Mooney is a sun to ring reduction from the hydrostatic input and it appears that the arrangement precludes a sun to carrier reduction. Speed is also limited as third gear is restricted to a range having the same slope as first/reverse and the total speed variation of first and reverse combined requires a trade-off between first range torque and total transmission speed range in a situation in which the total forward range of speed is already limited by use of one half of the range of the hydraulic motor in the first range for reverse. There is no possibility of adding additional ranges as all available combinations of the two inputs with the four elements of the two planetaries not connected to output have been used.

DESCRIPTION OF PREFERRED EMBODIMENTS

Figure 1:
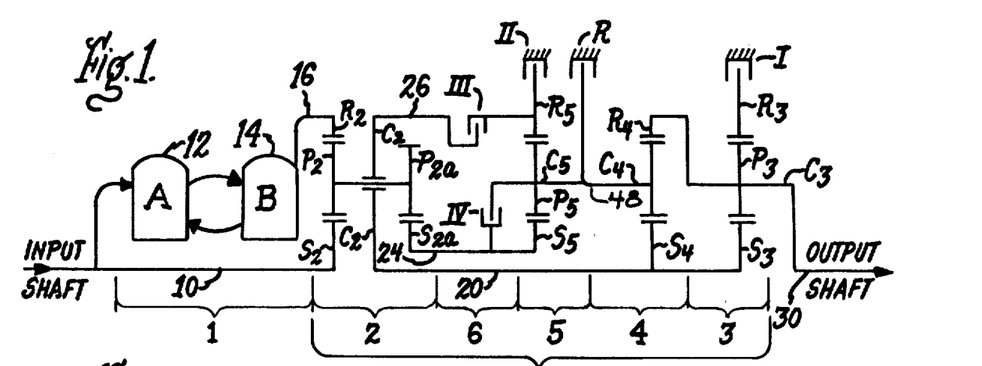
FIG. 1 is a schematic illustration of a single output hydromechanical transmission according to the invention in which both the gear train package and the mechanical and hydrostatic inputs are concentric about a single axis and wherein the gear train package has four forward and one reverse hydromechanical ranges.
Figure 9:
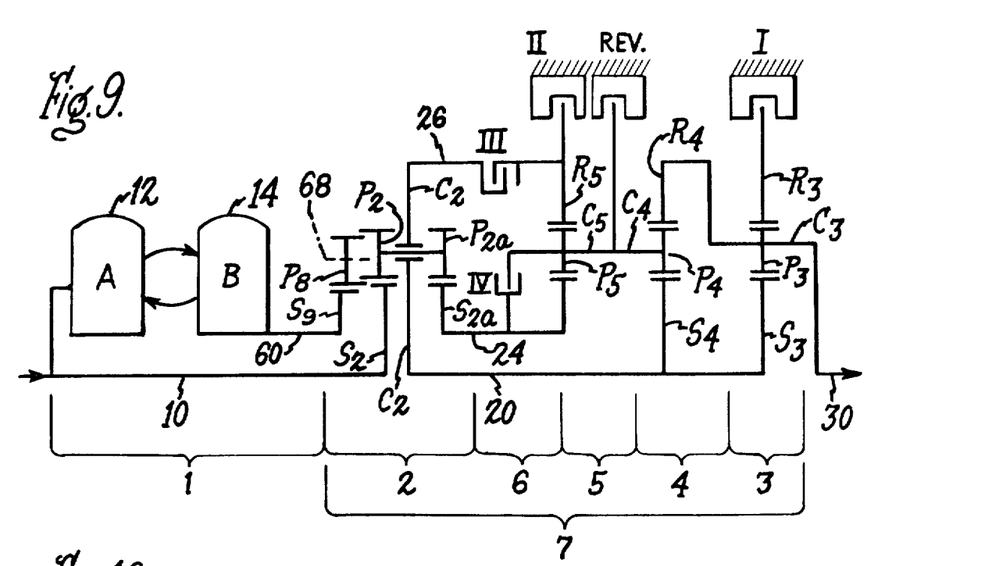
FIG. 9 is a schematic illustration of a single output hydromechanical transmission substantially identical to that of FIG. 1 but wherein there is a different interconnection between the "B" unit 14 of the infinitely variable component and the gear train package 7.
Figure 10:
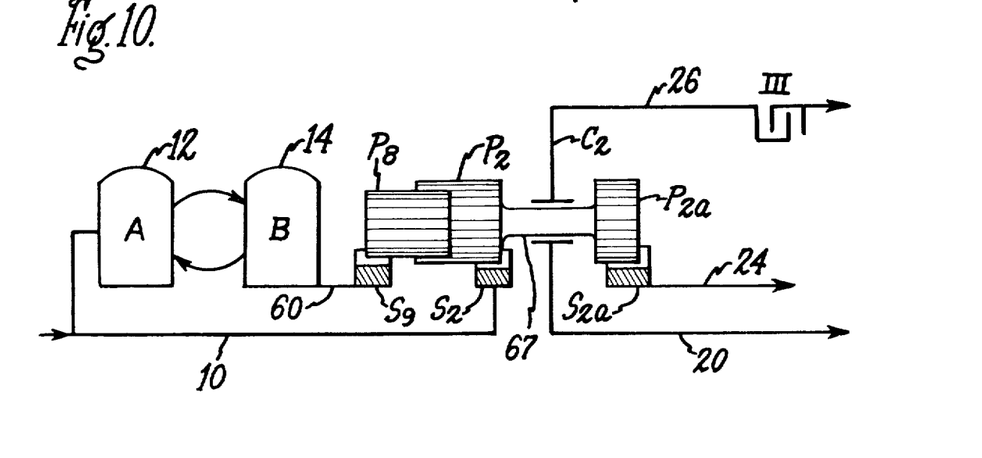
FIG. 10 is a schematic illustration of a part of FIG. 9 wherein some of the elements forming the interconnection between the "B" unit of the infinitely variable component and the gearbox are shown in elevation.

A preferred embodiment of the invention in its most simple form of application to a transmission is illustrated in FIG. 1 of the drawings. It is an all concentric infinitely variable multi-range synchronous shifting hydromechanical transmission requiring just four planetary gear sets for a transmission having an independent reverse and plural forward ranges (i.e., three or more distinct ranges). The transmission illustrated is concentric about the axis of input shaft 10, gear train package shaft 20, and output shaft 30 and is made up of an infinitely variable component 1, four planetary gear sets 2, 3, 4 and 5, additional range clutches 6 and the three shafts 10, 20, 30. The planetaries and clutches with shaft 20 constitute a novel multi-range concentric gear train package 7 which, in the form shown or in still more simplified versions depending upon requirements, is the core of the invention and has utility in combination with the hydraulic component 1 as shown to constitute a heavy duty truck transmission as well as in other combinations. As a truck transmission, the input shaft would be attached to the vehicle power plant and the output shaft 30 to a drive shaft to provide power to driving wheels as, for example, through a differential. The infinitely variable component 1 is illustrated as a hydraulic component having a variable capacity positive displacement hydraulic pump or "A" unit 12 which drives a positive displacement hydraulic motor or "B" unit 14, to drive an output 16 (or 60 as shown in FIG. 9 and FIG. 10) as the result of attachment of the "A" unit pump 12 to the input shaft 10 which is driven by an engine. The hydraulic motor or "B" unit may have either a fixed or a variable capacity. All of pump 12, motor 14 and hydrostatic output drum 16 rotate about the axis of shaft 10. Although this system as contemplated in the invention uses radial ball piston units for "A" and "B", this is not a limitation on the hydraulic units to be selected as an infinitely variable component for use with the gear train package or, for that matter, use of a hydrostatic device as the infinitely variable component. Planetary gear set 2, which is driven both by shaft 10 which is mechanically driven by the power plant and by output 16 of the hydrostatic unit, can be regarded as a mixer set because it has as one of its functions the production of a hydromechanical output as a result of mixing the mechanical output of shaft 10 and the hydrostatic output of 16. Planetary set 2 is a compound planetary set, as will be explained in more detail below, which serves to produce multiple inputs to various elements including shaft 20, hollow shaft 24 and drum 26 which rotate concentrically with each other about the axis of shaft 20.

CONCENTRIC MULTI-RANGE GEAR PACKAGE

Figure 2:
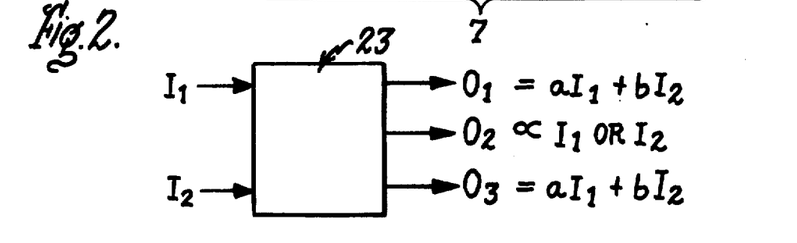
FIG. 2 is a schematic illustration of the theory involved in a component which is used in this invention to obtain concentricity of planetary gear sets about a single axis in a multi-range hydromechanical transmission.
Figure 6:
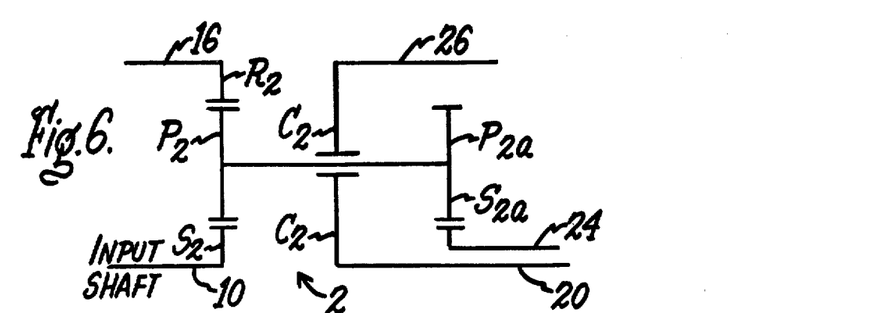
FIG. 6 is a separate illustration of the component of the gear train of FIG. 1 that implements the principle illustrated in FIG. 2.

The compound planetary set 2 with its multiple outputs which is also illustrated separately as FIG. 6 is the key to the all concentric arrangement of gear package 7 of FIG. 1 as it permits the driving of elements of successive planetary sets selectively with one of two different inputs. FIG. 2 illustrates the theory on which this novel multi-range concentric gear train package is based. With the "exterior" outputs $O_1$ and $O_3$ being a function of both inputs and the "interior" output $O_2$ being directly proportional to (or the same as) one input, the one input as output $O_2$ has in effect been passed through that other compound output. This permits fabrication of a set of three concentric shafts wherein the motion carried by the intermediate shaft can readily be combined with a motion carried by both the inner (central or axial) shaft and the outer shaft by successive concentric planetary gear sets located along the common axis to produce multiple combinations of those motions without interference of moving parts. FIG. 2, therefore, indicates that any component such as that represented by the block 23, which will perform the mission as illustrated, can be used as a basis for a multi-range all concentric gear train. The mission as illustrated is that device 23 receives two inputs represented by $I_1$ and $I_2$ and produces two different functions of the inputs wherein one function is produced on the intermediate shaft and the other, different function is produced on both the inner and outer shafts. In the illustration shown in FIG. 2, the function on the intermediate shaft represented by $O_2$ is a motion which is directly proportional (or equal) to one of the two inputs and the motion on both the inner and outer shafts represented by $O_1$ and $O_3$ is the weighted sum of the two inputs. The particular function, and particularly the weightings of the sum and the selection as to which input forms the basis for output $O_2$, can be selected as a matter of convenience or design to meet the particular combinations of the two inputs needed for the mission to be accomplished. The compound planetary gear set 2 meets the requirement of a device 23 in that it produces on central shaft 20 and on the drum 26 of the concentric gear train package 7 a hydromechanical function which is the weighted sum of the mechanical input on shaft 10 and the hydrostatic input available at 16 while simultaneously reproducing on hollow shaft 24 the same mechanical input from shaft 10 without modification. Compound planetary set 2 accomplishes this by virtue of the fact that carrier $C_2$ of set 2 which is driven as a result of the action on planetary gears $P_2$ of the rotation of sun gear $S_2$ driven mechanically by shaft 10 and the rotation of ring gear $R_2$ driven hydrostatically by motor "B" through drum 16 not only drives central shaft 20 but also permits the use of a second set of planetary gears $P_{2a}$ which exactly reproduce the actions of the primary planetary gears $P_2$ of the set 2. This arrangement causes the second set of planetary gears $P_{2a}$ to drive sun gear $S_{2a}$ to produce on sun gear $S_{2a}$ a movement which is proportional or identical to the movement of sun gear $S_2$. Therefore, hollow shaft 24 rotates at a speed which is proportional or identical to that of input shaft 10, depending on the relative sizes of sun gears $S_2$ and $S_{2a}$. As noted above, a different pair of outputs of planetary set 2 could be obtained by rearranging the inputs as, for example, driving sun $S_2$ hydrostatically and ring $R_2$ mechanically. As a variation, the output of the infinitely variable component 1 can be conveyed to the compound planetary set 2 by means of a hollow shaft 60 as shown in FIGS. 9 and 10 to an extra set of planetary gears rather than ring gear $R_2$ as shown in FIG. 1 to permit more latitude in selection of gear ratios as will be explained more fully below with respect to the description of FIGS. 9 and 10.

Figure 7:
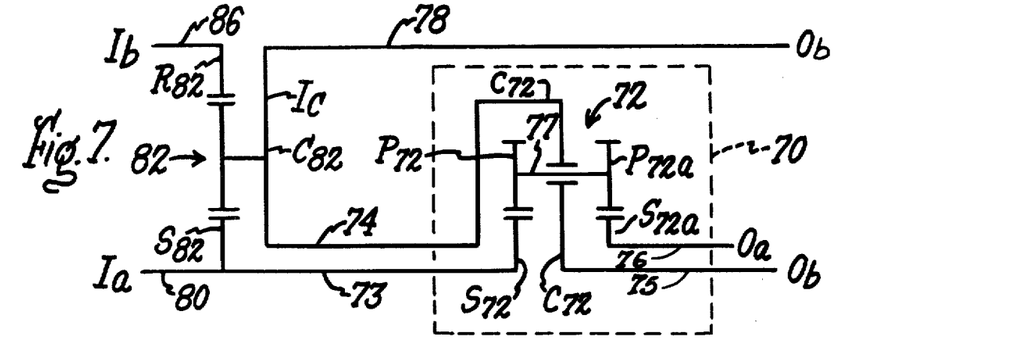
FIG. 7 is an illustration of an alternative implementation of the component illustrated in FIG. 6 wherein a portion of the component is the most basic implementation of one concept embodied in the principle.

As apparent from the separate FIG. 6 illustration, the concept illustrated in FIG. 2 requires the passing of one motion, i.e., that of sun $S_2$, through another motion, i.e., that of carrier $C_2$. In its very fundamental form, this is the same as exchanging the motions of two concentric shafts from one to the other. FIG. 7 illustrates a different implementation of the principle illustrated in FIG. 2 in the form of the combination of separate gears within broken line 70 to exchange motions between two sets of two concentric shafts after the two inputs $I_a$ and $I_b$ are used to generate a new function. These gears 70 include a compound planetary set 72 concentric with and interconnecting two sets of concentric shafts 73, 74 and 75, 76, all of which rotate about the axis defined by axial shafts 74 and 75. The compound planetary set 72 which has no ring gears is made up of a planetary carrier $C_{72}$ which carries dual sets of planetaries $P_{72}$ and $P_{72a}$, each pair of which are keyed together by a shaft 77 journaled in a bearing in the carrier $C_{72}$. The planetaries are meshed with sun gears $S_{72}$ and $S_{72a}$ to drive sun 72a responsive to sun 72. By this arrangement, the rotational motion of axial shaft 73 on the input side is passed through hollow shaft 74 to be applied to hollow shaft 76 while the motion of 74 is transferred to axial shaft 75. When combined with planetary set 82, the arrangement shown in FIG. 7 performs the same function as the compound planetary set 2 of FIGS. 1 and 6. Planetary set 82 in FIG. 7 serves to combine two inputs, such as $I_a$ and $I_b$, which are rotational motions about the axis of shaft 80 to form a third function $I_c$ on carrier $C_{82}$ which is transferred to hollow shaft 74 and hollow shaft or drum 78 without interferring with the extension of the shafts carrying the inputs as, for example, shaft 73 which is an extension of shaft 80. Similarly, drum 86 could be continued over drum 78 if there were a purpose. Comparison of planetary set 82 with block 23 of FIG. 2 indicates that the outputs ($O_1 = aI_1 + bI_2$; and $O_2 \propto I_1$ or $I_2$) differ only in the location of outputs in that in FIG. 2 the inner and outer shafts carry the same output and the intermediate shaft carries a second output whereas in the product of set 82, two proximate shafts carry one output and an "exterior" shaft carries the other. Gear set 70, therefore, when added to planetary set 82 provides for the relocation of the functions produced by set 82. This gear combination, in addition to solving a problem inherent in multi-range concentric gearboxes and contemplated by this invention, has application to and utility in other gear trains.

With the understanding that shaft 20 and drum 26 in FIG. 1 are being driven hydromechanically as the weighted sum of the two inputs, i.e., as $O_1$ and $O_3$ in the above hypothesis, and that the hollow shaft 24 is driven mechanically directly proportional to the mechanical input on shaft 10, i.e., as $O_2$ of the above hypothesis, the remainder of the multi-range concentric gear train package can be explained.

As generally noted above, the gear train package 7 is made up of four planetary gear sets 2, 3, 4 and 5 and additional range clutches 6 wherein planetary sets 3, 4 and 5 provide for the combining of the mechanical input from shaft 10 (and shaft 24) and the hydromechanical output of planetary set 2 in different distinct ratios to provide speed ranges.

The first and lowest range is derived in this configuration by use of the planetary gear set 3 wherein the ring gear $R_3$ of that set is provided with a brake I that indicates it is the first range brake. Application of that brake causes planetary set 3 to drive the output shaft from the basic hydromechanical output of planetary set 2 with a sun to carrier speed reduction as determined by the ratio of the gears of set 3. Planetary set 4 has a dual function in that with brake R, and only brake R applied, ring gear $R_4$ is driven as a result of sun gear $S_4$ also driven by the basic hydromechanical output of carrier $C_4$ driving against the stationary carrier $C_4$. Ring gear $R_4$ drives carrier $C_3$ and output shaft 30 directly. The addition of one element in the train over the number of elements used in the first range causes a reversal of direction and the use of sun to ring a different ratio than produced in range I. Planetary set 5 provides a different combination of mechanical and hydrostatic inputs as set 5 with brake II applied causes carrier $C_5$ to be driven mechanically by shaft 24 and sun gear $S_5$ at a sun to carrier reduction which drives carrier $C_4$ at that speed. The connection between carriers $C_4$ and $C_5$ can also be described as a hollow shaft which with the interconnection with the attachment for clutch IV can be referred to as an additional range shaft 48, 49. Activation of carrier $C_4$ causes ring gear $R_4$ to be driven as a resultant of the inputs to both carrier $C_4$ and sun $S_4$ which resultant is a further mixing of the hydromechanical output of carrier $C_2$ furnished through sun $S_4$ and the mechanical input from shaft 24 at the sun-carrier reduction from set 5. Clutches III and IV provide for additional inputs to cause carrier $C_5$ to produce two further outputs as the basis for two additional ranges. Clutch III, when engaged, places on ring gear $R_5$ the basic hydromechanical product of the mixer set 2 which increases in speed from the II-III shift point so that carrier $C_5$ will be driven as the resultant of that input and the mechanical input on sun $S_5$. Clutch IV locks planetary set 5 so that the output of carrier $C_5$ is one to one with, or the same as, sun $S_5$ which is proportional to the mechanical input speed.

Figure 8:
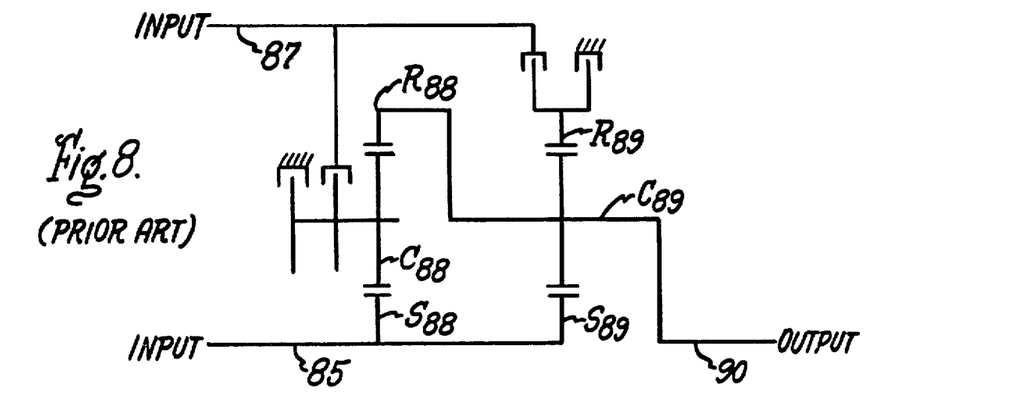
FIG. 8 is an illustration of a gear arrangement found in the prior art which is utilized in the novel gear train package of this invention.

Another way of describing the concentric gear train package 7 is to recognize the combination of planetaries 3 and 4 as a component previously used in various gear arrangements including other transmissions, such as that of Mooney already described, and usually referred to as a Simpson gear train. A Simpson gear train is an arrangement of two planetary gear sets used for effecting different combinations of two inputs. The two planetary sets are characteristically arranged co-axially with one input driving the sun gears of both sets as, for example, shaft 85 and sun gears $S_{88}$ and $S_{89}$ in the configuration shown in FIG. 8, and with the output of the two sets being driven by attachment to the carrier of one and the ring gear of the other of the two planetaries as, for example, output shaft 90, carrier $C_{89}$ and ring gear $R_{88}$. The two remaining components, carrier $C_{88}$ and ring gear $R_{89}$, of the two sets are available for any desired combinations of a second input and brakes as, for example, the second input shown on drum 87 and the clutches and brakes as shown. The "prior art" arrangement of FIG. 8 is a hypothetical composite of prior arrangements within the art and does not represent any identifiable prior art reference. The package 7 would, therefore, constitute the combination of a Simpson gear train with a gear train comprising planetary set 5 with brake and clutches to provide various inputs to the input carrier of the Simpson gear train and with the mixer set 2 to provide the two available inputs to set 5 without interferring with a direct input to the Simpson gear train. When compared with the prior art noted above, viz., Cockrell, Tipping, Polak and Mooney, the transmission as illustrated in FIG. 1, having the operation shown schematically in FIG. 3, can be described as an all concentric hydromechanical transmission having five distinct hydromechanical ranges, i.e., one reverse and four forward. A version without range IV is still one having four hydromechanical ranges. A mechanism such as the combination of the sets 2 and 5 with the interconnecting additional range elements by itself and as a means for providing multiple inputs to a Simpson gear train as the basis for a multiple hydromechanical transmission is original with the gear train package for transmissions forming the subject matter of this Application.

OPERATION OF GEAR TRAIN PACKAGE IN A TRANSMISSION

Figure 3:
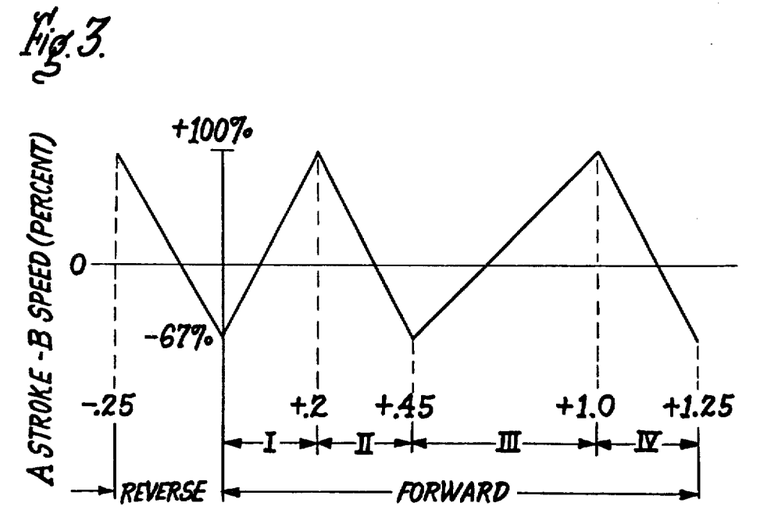
FIG. 3 is a graphic display of the relationship of the capacity of a variable displacement unit A, and the resulting speed in a constant displacement unit B of an infinitely variable component, to the synchronous shift points and output and input speeds.

Use of this gear train package as a component of a transmission is best explained with reference to FIG. 3. FIG. 3 based on the use of a variable displacement hydraulic pump and a constant displacement hydraulic motor B serves to illustrate one feasible implementation of the synchronous shifting transmission disclosed although the invention could be implemented with a different infinitely variable device. This implementation shows that the hydraulic components and the gear train ratios are selected so that a negative stroke of 67% on the pump "A" with its resulting running of the hydraulic motor "B" in reverse at 67% of pump speed will cause sun $S_2$ to run forward and ring $R_2$ to run backwards at speeds which offset each other so that, although the planetaries $P_2$ and $P_{2a}$ are spinning, carrier $C_2$ stands still. This permits the engagement of either the first range brake I or the reverse brake R without causing output shaft 30 to rotate as both ranges are driven from the basic hydromechanical output of planetary set 2. The 67% is illustrative only and not intended as limitation as indicated by the fact that another implementation contemplated uses a −95% as the zero output speed ratio to obtain a wider output speed range of the transmission in each gear range. In the implementation forming a basis of this explanation, the changing of the stroke, i.e., variation of the pump "A" capacity toward zero, and assuming that the first range brake I is applied, causes motor "B" which is running backwards at 67% of pump speed to slow down, causing carrier $C_2$ of planetary set to begin to move in reaction to the two inputs to cause the output shaft 30 to accelerate in the forward direction. Continued stroking of the capacity of the pump "A" in the positive direction causes motor "B" to decelerate to a zero speed and to then accelerate in the other direction which is regarded for this purpose as the positive or forward direction until motor "B" is running in the forward direction at 100% of pump (or input) speed. At this point, with the first range brake I engaged, the output shaft 30 is running at the maximum first range speed which is an output powered hydromechanically from gear train package axial shaft 20 reduced through planetary set 3 by a sun to carrier reduction. In reverse range, the result is only slightly different than in range I in that the mixer planetary set 2 performs in the same way to produce an increasing hydromechanical speed on shaft 20 which is utilized by planetary set 4 rather than planetary set 3. With first range brake I inactivated and reverse range brake R activated so as to lock carrier $C_4$ in position against rotation, the effect of driving sun gear $S_4$ as shaft 20 increases in speed is to cause ring gear $R_4$ to accelerate driving carrier $C_3$ of planetary set 3 in the direction opposite from that which it turned in range I by reason of the interventing planetary $P_4$ and at a different output ratio as the sun $S_4$ to ring $R_4$ reduction differs from the sun $S_3$ to carrier $C_3$ reduction ratio of the planetary set 3. It is noted that the particular implementation shown in FIG. 1 includes reverse as a distinct range which is not a limitation on this invention as the entire transmission could be made fully reversing by placing a reversing mechanism into the input shaft ahead of hydraulic component 1 with a corresponding deletion of the reverse brake R.

HIGHER SPEED RANGES

Higher speed ranges are provided through the additional combining of the hydromechanical output of carrier $C_2$ of set 2 and the mechanical input on shaft 10 which is reproduced on intermediate shaft 24 as another output of set 2 by means of the action of the second range planetary 5 in cooperation with planetary 4. For example, application of the second range brake II along with the release of first range brake I at the maximum speed in first range locks ring gear $R_5$ in a stationary position so that the effect of the mechanical input on shaft 24 and sun $S_5$ causes carrier $C_5$ to produce an output which is applied to carrier $C_4$ of planetary set 4. Since the second range is intended to be made operational through the application of second range brake II relatively simultaneously with release of first range brake I at a point which corresponds to a maximum forward rotation of hydraulic motor "B" as shown in FIG. 3, the planetary set connections and ratios must provide for an increasing output speed of carrier $C_3$ and shaft 30 as a result of a decreasing speed of hydraulic motor "B" to zero followed by an increase in speed of motor "B" in the negative direction as indicated by the line within the second range section of the illustration of FIG. 3. Carrier $C_4$, therefore, starts at a speed which, when combined with the hydromechanical input furnished by sun $S_4$, produces a speed in the ring $R_4$ which is the same as the speed at which carrier $C_3$ was being driven at top speed in first range to cause a synchronous shift to second range. From there, the gearing is such that a deceleration of speed of the sun gear $S_4$ as driven by shaft 20 causes ring gear $R_4$ and carrier $C_3$ and output shaft 30 to further accelerate in the forward direction until such time as the speed of hydraulic motor "B" in the negative direction reaches the design point ($-67\%$ in the implementation illustrated but as noted above $-95\%$ in another implementation contemplated but not specifically described) at which time maximum speed in second range has been attained.

In the embodiment illustrated in FIG. 1, a third range is obtained by means of driving the ring gear $R_5$ of the second range planetary 5 by means of an input taken from the hydromechanical output 26 from carrier $C_2$ of the mixer planetary set 2 which is the basic hydromechanical output of set 2. This is feasible because at the indicated shift point of $-67\%$ of hydraulic motor "B", carrier $C_2$ and, therefore, drum 26 are stationary so that third range clutch III can be engaged to constitute a synchronous shift from second to third range with an accompanying release of second range brake II. From that shift point as noted before with respect to first range, a stroking of pump "A" in the positive direction with the third range clutch engaged will cause motor "B" which is running backwards to begin to slow so that carrier $C_2$ which had been stopped begins to accelerate causing a different effect on carrier $C_5$ than that previously described. The set 5 serves to further mix the mechanical input available at sun 5 with the basic hydromechanical output of set 2 applied to ring $R_5$ to drive carrier $C_5$ and consequently carrier $C_4$ with that resultant. A further mixing of that resultant with the basic hydromechanical output from sun $S_4$ which is also just beginning to accelerate causes ring gear $R_4$ and consequently carrier $C_3$ and output shaft 30 to further increase in speed in forward direction.

When the maximum speed in third range is attained and which, as illustrated in FIG. 3, is a point at which hydraulic motor "B" is running forwardly at 100% speed, which is the speed of the mechanical input, a synchronous shift is obtained by "locking up" planetary set 5 by means of fourth range clutch IV as carrier $C_5$ at that point is running at the same speed as shaft 24. Destroking of the capacity of pump "A" then causes hydraulic motor "B" which was running at 100% forward speed to decelerate causing carrier $C_2$ and, consequently, shaft 20 to decelerate. This action, when operating against the constant mechanical speed carrier $C_4$, will cause a further acceleration in ring gear $R_4$, carrier $C_3$ and a further acceleration of output shaft 30 in a fourth forward range. As indicated in the row of numbers on FIG. 3 just above the Roman numerals indicating the ranges, the first to second range shift point occurs with the output shaft running at 20% of a direct drive speed. The other shift points and maximum fourth range speed are at the ratios indicated with respect to the input speed.

In the implementation described, as illustrated in FIG. 3, the slopes of the A STROKE-B SPEED lines are the same with the parallelism indicating an identity of gear ratio offset in output speed by some variable factor. The commonality of slope lines reflects the fact that each range is primarily driven with the basic hydromechanical output of mixer set 2 from carrier $C_2$ through the sun to ring reduction in planetary set 4 and as shown in FIG. 3 with a resulting output range speed of 25% of input speed. The displacement of the three ranges, i.e., reverse, second and fourth, depends on the condition placed on carrier $C_4$. In reverse, $C_4$ is locked. In second range, $C_4$ is driven from carrier $C_5$ by the mechanical input on $S_5$ against a locked $R_5$ at the sun-carrier reduction which causes $C_4$ to rotate at approximately one-third of input speed. In fourth range, $C_4$ again driven from $C_5$ reflects the fact that clutch IV locks carrier $C_5$ directly to hollow shaft 24 to cause $C_4$ to turn at input speed. This examination permits description of the gear train in the terms of using a planetary gear set to obtain a sun to ring reduction of the basic hydromechanical output produced as a summation in a mixing element of input speed and the contribution of an infinitely variable device and using the carrier of that set to introduce different (each relatively constant) offset speeds each derived from the system input speed to produce multiple distinct ranges of output. Ranges produced in this fashion can be used as alternate ranges in a transmission and can constitute any number of such ranges for which separate offset differences can be obtained to introduce through the carrier.

As already indicated, reversing can be provided either by means of the reverse range brake R or by means of a full reversing system in the power input train and this gear train can be implemented with or without the fourth range; however, attaining of more than two forward hydromechanical ranges in an all concentric gearbox requires the novel arrangement of the compound mixer planetary 2 which executes the concept illustrated in FIG. 2 and constitutes the central theme of this invention.

STEERING TRANSMISSION

Figure 4:
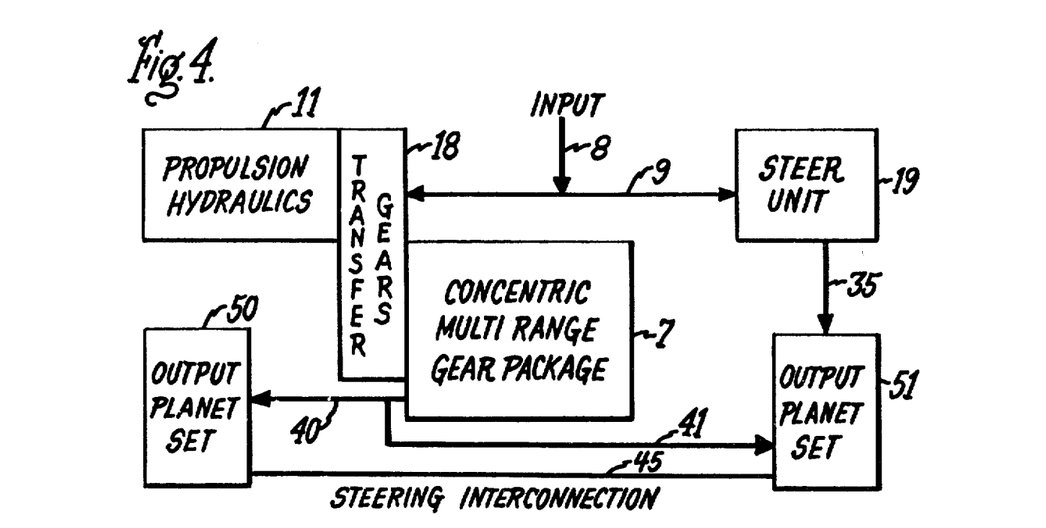
FIG. 4 is a block diagram showing the application of the concentric gear train package of FIG. 1 to a novel steering transmission.

As noted above, the multi-range concentric gear train package as identified at 7 in FIG. 1 including the four planetaries and the additional range clutches can be used as an entity in combinations to form other transmissions as, for example, that illustrated in block diagram in FIG. 4. The block in FIG. 4 identified as the concentric multi-range gear package 7 comprises those same elements identified as 2 through 6 in FIG. 1 or their equivalents and demonstrates how the gear package can be used as the nucleus of a different transmission which in the case illustrated is a steering transmission of track laying vehicles or for multiple axle all-wheel drive wheeled vehicles. In this implementation, the propulsion hydraulics 11 which is the same component as the infinitely variable component 1 of FIG. 1 is physically separated from the gear package 7 and connected thereto by means of transfer gears 18. This permits driving both the propulsion hydraulics 11 and a steer unit 19 from a common input 8 and a power shaft 9. In this implementation, the output of the gear package 7 as indicated at 40 and 41 provides power to separately located output planet sets 50 and 51 to permit operation of the steering system as a part of the final drive of the vehicle. The steering unit 19 is connected to the output planet set 51 and indicated at 35 and by the steering interconnection 45 to output planet 50 to cause a speed differential between the two output planet sets to accomplish the steering wherein a steering differential speed is provided to output planet set 51 with an equal and opposite steering input to output planet set 50. Although FIG. 4 generally illustrates that the concentric gear package can be used in various combinations with other components to form different transmissions, FIG. 5 shows a specific implementation of a transmission corresponding to that shown in the block diagrams in FIG. 4.

Figure 5:
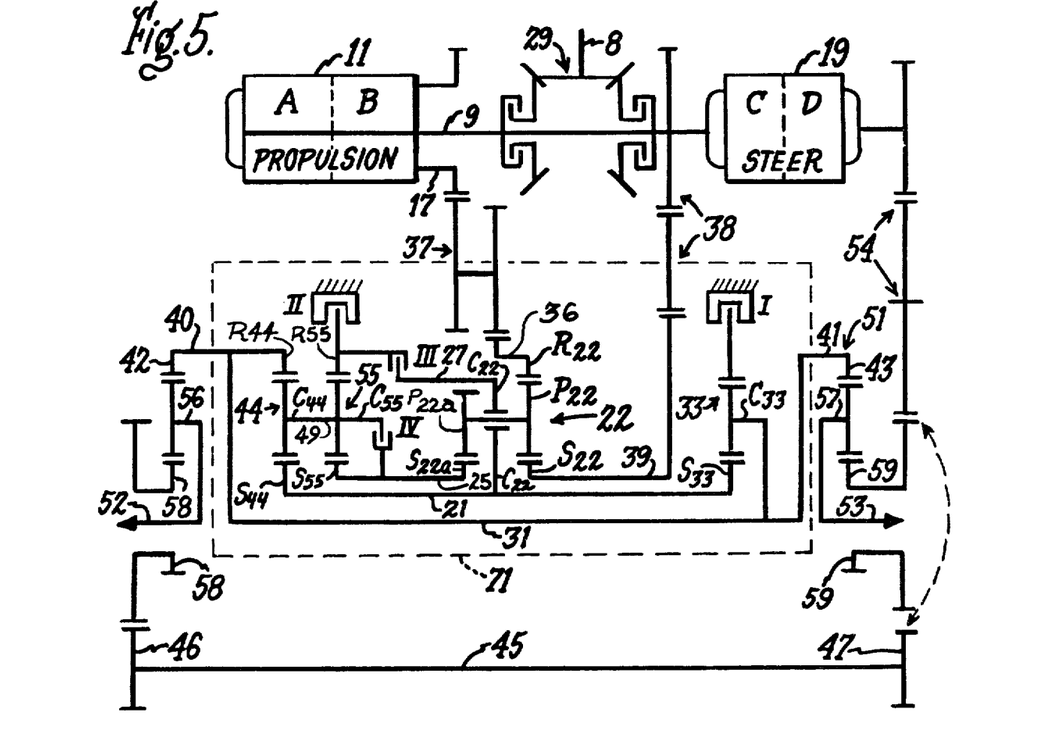
FIG. 5 is a schematic illustration of a hydromechanical steering transmission incorporating the concentric gear train package of FIG. 1 according to the block diagram of FIG. 4.

FIG. 5 is a schematic illustration of an implementation of a hydromechanical steering transmission according to the block diagram of FIG. 4 which includes a modified implementation of the concentric gear train package 7 of FIG. 1 as indicated by the broken line box 71 in the FIG. 1. The transmission, in addition to the gear train package 71, has an input shaft 8 which is connected to a power shaft 9 by means of a full reversing differential device 19 which includes two clutches, one for forward and one for reverse motion. Power shaft 9 drives both an infinitely variable component 11 which, in this implementation, is the same hydrostatic positive displacement device including a variable capacity pump "A" and a fixed capacity motor "B" as the component 1 portion of the transmission illustrated in FIG. 1. Hydrostatic drive is provided to the gear train package 71 by means of gear 17 and transfer gears 37 to provide speed and torque to ring gear $R_{22}$ which will be described in conjunction with description of the concentric gear package 71. Mechanical power from the input through power shaft 9 is also supplied to the gear train package 71 by transfer gears 38 to provide mechanical drive to hollow shaft 39 to drive sun gear $S_{22}$.

As noted above, the concentric multi-range gear train package as illustrated in the block 71 of FIG. 5 is a modification of the package 7 of FIG. 1 in two respects. In view of the use of the full reversing device 29 using two clutches, package 71 does not include a reverse brake although without the full reversing device a complete reverse range could be included solely by the addition of a reverse brake. There is also a slight relocation of certain components resulting from the fact that in a steering transmission it is impossible to insert either the mechanical or the variable drive along the centerline of the concentric gear package without using an offset train for the output. In package 71, the planetary sets 22, 33, 44 and 55 are comparable to and serve the same functions as the planetary sets, 2, 3, 4 and 5 of package 7 in FIG. 1 except for the fact that there is no provision for locking carrier $C_{44}$ against rotation to provide a distinct reverse range which could be done if full reversing were not used. Mechanical drive is inserted by means of hollow shaft 39 which drives the sun gear $S_{22}$ of set 22 in the same way that input shaft 10 drives sun gear $S_2$ in the FIG. 1 implementation and hydrostatic drive is inserted by means of gear ring gear $R_{22}$ of planetary set 22 comparably to the way drum 16 drives ring gear $R_2$ in the FIG. 1 implementation. Also comparably to the implementations illustrated in FIGS. 9 and 10, the infinitely variable (hydrostatic) drive could be inserted by an extra set of planetary gears mounted on the carrier $C_{22}$ as a substitution for ring gear $R_{22}$. The extra set of planetary gears (not illustrated) would be on the same side of $C_{22}$ as are $P_{22}$, would intermesh with $P_{22}$ and would be driven either by a ring gear (not illustrated) similar to $R_{22}$ or by a separate pinion. The output of gear package 71 is provided by means of drums 40 and 41 which are interconnected by axially located drive shaft 31 to accommodate the requirements of a steering transmission having a "steer over" device that the transmission output be supplied to final drive planetaries to permit application of a differential speed for steering. In this implementation, 50 and 51 are the final drive planetaries and the drums 40 and 41 supply power to the ring gears 42 and 43 of the planetaries. From the ring gears 42 and 43, power is supplied to final drive axles 52 and 53 by means of the planetary gears and carriers 56 and 57 of the output planet sets. A differential speed is applied to sun gears 58 and 59 of the output planetary sets by means of transfer gears 54 and steering interconnection shaft 45. The steering differential speed is derived from steer unit 19 which is driven by power shaft 9 and which constitutes an infinitely variable device which can be implemented as a hydrostatic unit including a variable capacity positive displacement hydraulic pump unit "C" and constant capacity positive displacement hydraulic motor unit "D" similar to the "A" and "B" units used for propulsion. By means of steer unit 19, transfer gears 54, steering unit interconnection shaft 45, and idler gears 46, 47, a rotation in either direction can be imparted to output planet set sun gear 59 with a corresponding motion in the opposite direction simultaneously applied to sun gear 58 of output planetary 50. In this way, final drive axles 52 and 53 are driven by means of gear package 71 while a differential speed for steering is imparted by mechanisms just described.

The implementation of FIG. 5 can also be described in terms of additions to a Simpson gear train with the notation that planetaries 33 and 44 although separated by other elements are connected and used in the Simpson fashion. The other components, i.e., the mixer and "concentricising" set 22 and the additional range gear train elements 55, 25, 27 and clutches, find a one-to-one relationship with comparable portions of the implementation of FIG. 1 except for being reversed from right to left.

OPERATION OF CONCENTRIC GEAR TRAIN PACKAGE IN STEERING TRANSMISSION

In the steering transmission, the concentric gear train package, as noted above, receives power from the hydrostatic propulsion unit 11 at ring gear $R_{22}$ by means of transfer gears 37 and from the mechanical drive at sun gear $S_{22}$ by means of transfer gears 38 and hollow shaft 39. Compound planetary set 22 is the same as, and performs the same function as, planetary set 2 in the basic configuration shown in FIG. 1. As a mixer set, it produces the basic hydromechanical output on carrier $C_{22}$ and on hollow shaft 21 which is comparable in function to the shaft 20 and also places the same output generated by carrier $C_{22}$ on drum 27. Low range which is put into play by means of activating brake I to lock the ring gear $R_{33}$ of planetary set 33 causes the output shaft 31 to be driven from shaft 21 by means of the sun to carrier reduction taken within planetary set 33. As noted previously, output shaft 31 drives drums 40 and 41 placing the output of the gear pack onto the ring gears 42 and 43 of the left and right final drive planetary sets 50 and 51. Second range is activated by means of brake II which locks ring gear $R_{55}$ of planetary set 55 to ground and causes carriers $C_{55}$ and $C_{44}$ to be driven as a result of a sun to carrier reduction in set 55 by means of the mechanical drive which has been carried through from sun $S_{22}$, planetary $P_{22}$, planetary $P_{22a}$, sun $S_{22a}$, hollow shaft 25 and sun gear $S_{55}$. Planetary set 44, therefore, serves to combine the mechanical input which is driving carrier $C_{44}$ with a sun to carrier reduction in set 55 with the basic hydromechanical output of set 22 inserted by shaft 21 through sun $S_{44}$ to drive ring $R_{44}$ as a resultant. Ring $R_{44}$, of course, is attached directly to both the shaft 31 and drums 40 and 41 to drive the ring gears 42 and 43 of the output planetary set. Third and fourth range operation is also the same in this implementation as in that of FIG. 1 as fourth range merely places 100% of mechanical input speed onto carrier $C_{44}$ as opposed to the approximately one-third mechanical input speed of second range. Third range which is obtained through activation of clutch III introduces the basic hydromechanical output of mixer set 22 to ring $R_{55}$ so that a resultant of that speed and the mechanical speed on 21 is furnished to carrier $C_{44}$. With reference to FIG. 3, it is noted that the stroking of the hydraulic components in third range is reversed from ranges 2 and 4 and the range is obtained by inserting the basic output hydromechanical speed which runs from the reverse 67% to a forward 100% transmitted from carrier $C_{22}$ through the third range clutch to the ring gear $R_{55}$ of set 55. This, in combination with constant mechanical drive on sun $S_{55}$, places a variable speed on carrier $C_{44}$ where it is again combined with the basic hydromechanical speed on sum $S_{44}$ to drive ring $R_{44}$ over the third range speed range.

FIGS. 9 and 10 illustrate a slight variation on the hydromechanical transmission illustrated in FIG. 1 in which the output of the infinitely variable component 1 is transmitted from the "B" unit to the compound planetary gear set 2 by means of a hollow shaft 60 which drives an additional planetary set $P_9$ rather than by means of the hollow shaft 16 which drives ring gear $R_2$. This variation is described and illustrated principally to avoid any inference that the transmissions in either the single output form as shown in FIGS. 1 and 9 or in the steering transmission form shown in FIG. 5 is limited to the gear ratios normally attainable by using a planetary set in which the inputs are put on sun and ring to produce an output on the carrier. Because there is a practical limitation on the tooth-count ratios among ring, planetary and sun gears resulting from the fact that it is not feasible to use either planetary or sun gears smaller than a particular size in comparison to the other two gears of a set, it is common practice in the art to limit a planetary set to be used for ring and sun inputs to produce a carrier output to a range between 80/20 and 60/40 ratios (wherein the first number represents ring and the second number, the sun). Other ratios can be obtained by using a compound planetary set as shown in FIGS. 9 and 10 in lieu of a ring gear for one of the two inputs to the set. This compound planetary arrangement will permit, for example, a 50/50 ratio or other ratios outside of the 80/20–60/40 practical limitations. As shown in FIG. 9, the hollow shaft 60, instead of driving ring gear $R_2$ as shown in FIG. 1, drives the additional set of planetary gears $P_9$ which in addition to being meshed with sun $S_9$ are also meshed with the planetaries $P_2$ of the compound planetary gear set 2. The actual arrangement is better illustrated in FIG. 10 where for the purpose of this explanation one planetary gear of each of the planetary sets $P_9$, $P_2$, $P_{2a}$ is shown in elevation along with a portion of the sun gear $S_9$, $S_2$ and $S_{2a}$ with which they mesh. As previously explained with respect to the FIG. 1 configuration, sun gear $S_2$ meshes with and drive planetary gears $P_2$ which are keyed to planetaries $P_{2a}$ by means of shafts 67 journalled in carrier 62 so that the rotation of $P_{2a}$ duplicates that of $P_2$ about shaft 67. By meshing the additional planetaries $P_9$ between the sun $S_9$ and $P_2$, the additional input derived from the infinitely variable component is placed on planetaries $P_2$ with the same effect as obtained in the ring gear version of FIG. 1 so as to cause planetaries $P_2$ not only to rotate about their own axes but to progress about the axis dictated by the carrier $C_2$ thereby driving carrier $C_2$ and the attached shafts 20 and 26. The planetaries $P_9$ are also attached to the carrier $C_2$ by means of shafts (which are omitted from the illustration so that they do not obscure other elements) to which they are journalled for free rotation. The shafts connecting planetaries $P_9$ to the carrier $C_2$ are parallel to, but spaced from, shafts 67. One such shaft is indicated by the dotted line 68 in FIG. 9. As already noted, this variation presents a means for implementation of the invention in a practical way over a wider range of gear ratios than that provided for by means of the ring gear input shown in FIG. 1 and is as applicable to the steering transmission illustrated in FIG. 5 as it is to the single output transmission of FIG. 1.

What is claimed as new and desired to be secured by Letters Patent of the United States is:

1. A concentric multi-range gear train (7, 71) for transmissions comprising:

two concentric input shafts (10, 16, 10, 60, 36, 39);

an output shaft (30, 40) concentric with said input shafts;

a first gear train component (2, 22) connected to said two concentric input shafts for receiving two rotational input movements, for mixing those two movements to provide a third movement which is a weighted sum of the two input movements and for driving a set of three shafts (20, 24, 26, 21, 25, 27) with two outputs one of which is said third movement and the other of which is directly proportional to one of said two input movements, said three shafts also being concentric with said output shaft (30, 40) and said two concentric input shafts (10, 16, 10, 60, 36, 39), one said output driving the intermediate (24, 25) of the said three concentric shafts and the other said output driving the other two shafts (20, 26, 21, 27) of the said set of three concentric shafts;

an additional range gear train component (5, 6, 55) attached to the said intermediate (24) and to one of said other two (20, 26) of said set of three concentric shafts and to an additional range shaft (48, 49) which is also concentric with said other concentric shafts, said additional range gear train component comprising a three-element differential device (5, 55) having a first element connected to said intermediate shaft (24, 25) of said set of three shafts, a second element attached to said additional range shaft (48, 49) and a third element, a brake (II) for selectively securing said third element against rotation, a clutch (III) for selectively securing said third element to one of said other two shafts of the said set of three shafts and a clutch (IV) for selectively locking said first and second elements together to cause said additional range shaft (48, 49) to be driven by said intermediate shaft (24, 25) at the same speed as said intermediate shaft;

a low range and output gear train component (3, 4) including two (3, 4, 33, 44) three-element differential devices wherein a first element of each said device is attached to the one (20, 21) of said other two of said set of three concentric shafts which is not attached to said additional range gear train (5, 6), a second element of one said device (4, 44) is connected to said additional range shaft (48), the second element of the other (3, 33) said device is connected to the said output shaft (30, 41) and to the third element of said one device (4, 44), and the third element of said other said device is attached to a brake (I);

whereby engagement of the brake (I) of said low range and output gear train component causes said output shaft (30, 41) to be driven in a distinct first range which is a function of said third movement and whereby said additional range shaft and said second element of said other device of said three-element differential devices of said low range and output gear train component can be driven in three distinctly different speed ranges derived from the two said outputs of said first gear train component to provide said output shaft to be selectively driven in three distinct forward ranges in addition to said distinct first range.

2. The concentric multi-range gear train of claim 1 wherein said additional range gear train component (5, 6) further includes a brake (R) for selectively securing said second element ($C_5$) of said three-element differential device of said additional range gear train and said additional range shaft against rotation;

whereby said output shaft (30) can be caused to operate in a still additional distinct fifth range which is a reverse range.

3. The multi-range gear train (71) of claim 1 wherein: there is a second output shaft;
said two output shafts (40, 41) extend in opposite directions from said gear train;
there is an axial cross shaft (31) extending through said gear train about which all said concentric shafts and devices are concentric, said cross shaft interconnecting both said output shafts (40, 41) and also forming, in said low range and output gear component (33, 44), part of the connection between the third element ($R_{44}$) of the said one device (44) and the said second element ($C_{33}$) of the other said device (33) of said two three-element differential devices (33, 44).

4. The structure of claim 3 further comprising:
two three-element final drive differential gears (50, 51) each having a first element (42, 43) connected to one said output shaft (40, 41), a second element (58, 59) for attachment to a steer differential mechanism and a third element (56, 57) connected to a shaft constituting a steering transmission final drive output (52, 53);
a mechanical power drive input shaft means (8, 9);
an infinitely variable drive component (11) driven by said mechanical power drive input shaft means and including an output connection (17);
transfer gears (29, 37, 38) including gear means interconnecting said mechanical power drive input shaft means and one of said two concentric input shafts (39) and interconnecting said output connection of said infinitely variable drive component and the other (36) one of the said two concentric input shafts;
a differential steering including a steer drive unit (19) powered by connection to said mechanical power drive input shaft means and a steer differential mechanism (54, 45) interconnecting said steer drive unit and each said second element of said three-element final drive differential gears for applying the output of said steer drive unit positively to one and negatively to the other of said second elements (58, 59);

whereby said structure constitutes a multi-range steering transmission for track laying vehicles having four forward ranges.

5. The structure of claim 4 wherein said transfer gears (29, 37, 38) include a reversing means (29) whereby said structure constitutes a full reversing four range steering transmission.

6. The gear train (7) of claim 1 further comprising:
a mechanical power drive input shaft means (10);
an infinitely variable drive component (1) driven by said mechanical power drive input shaft means and including a variable drive output shaft means (16, 60);
said mechanical drive input shaft means (10) and said variable drive output shaft means (16, 60) being concentric and each being concentric with and connected to one of the said two concentric input shafts (10, 16, 60);
whereby said gear train with said variable drive component constitutes an all concentric synchronous shifting transmission.

7. The structure of claim 6 wherein:
said additional range gear train component (5, 6) further includes a brake (R) for selectively securing said second element ($C_5$) of said three-element differential device (5) of said additional range gear train and said additional range shaft against rotation;
whereby said output shaft (30) and said transmission can be caused to operate in a still additional distinct fifth range which is a reverse range.

8. The structure of claim 6 wherein:
said infinitely variable drive component is a hydrostatic component having elements (12, 14) which are concentric with and rotate about said mechanical power drive input shaft means (10);
said third movement which is a weighted sum of the rotational inputs from the mechanical power drive shaft means and the said hydrostatic component is hydromechanical; and
said other output of said first gear train component is directly proportional to the rotational input from said mechanical power drive shaft means.

9. In a multi-range transmission having concentric gear elements for combining the inputs available from two concentric input shafts into one or more intermediate rotational speeds and a final stage having concentric gear elements for the further combining of said intermediate speeds with the inputs from one of said two concentric shafts, the improvement of an intermediate range gear package comprising:
first and second concentric input shafts (10, 39, 16, 60, 36);
a compound planetary gear set (2, 22) including:
a first sun gear $S_2$, $S_{22}$, $S_{72}$ attached to said first input shaft,
a second sun gear $S_{2a}$, $S_{22a}$, $S_{72a}$ attached to a first hollow shaft (24, 25, 76$_a$),
a planetary carrier having a first crank arm extending between said sun gears to an attachment to a core shaft (20, 21, 75) extending through said hollow shaft to said final stage, said core shaft being concentric with said input shafts and said sun gears, compound planetary gears each rotatably mounted on said carrier with gear engaging surfaces on each side of said carrier intermeshing with both said sun gears, a second crank arm attached to said carrier and extending away from said core shaft;

said second crank arm (74, $C_2$, $C_{22}$) being attached to a second hollow shaft (26, 27, 78) which is concentric with the other said shafts;

a second planetary gear set (5, 55) concentric with said surrounding said core shaft including a sun gear attached to said first hollow shaft, a ring gear and a carrier attached to and supporting a third concentric hollow shaft for interconnecting said second planetary gear set with said final stage;

brake means for selectively immobilizing said ring gear of said second planetary set;

clutch means for selectively attaching said second hollow shaft to said ring gear of said second planetary set; and clutch means for selectively attaching said first hollow shaft to said carrier of said second planetary set;

whereby said intermediate range gear package provides three distinct rotational speeds which are derived from said two inputs.

10. The improvement of claim 9 further comprising brake means for selectively immobilizing said carrier of said second planetary gear set and said third concentric hollow shaft.

* * * * *